July 22, 1924.　　　　　　　　　　　　　　　　　　　　　1,502,344
H. J. MURRAY
INSTRUMENT SAFE FOR AUTOMOTIVE VEHICLES
Filed Jan. 12, 1921　　　2 Sheets-Sheet 1
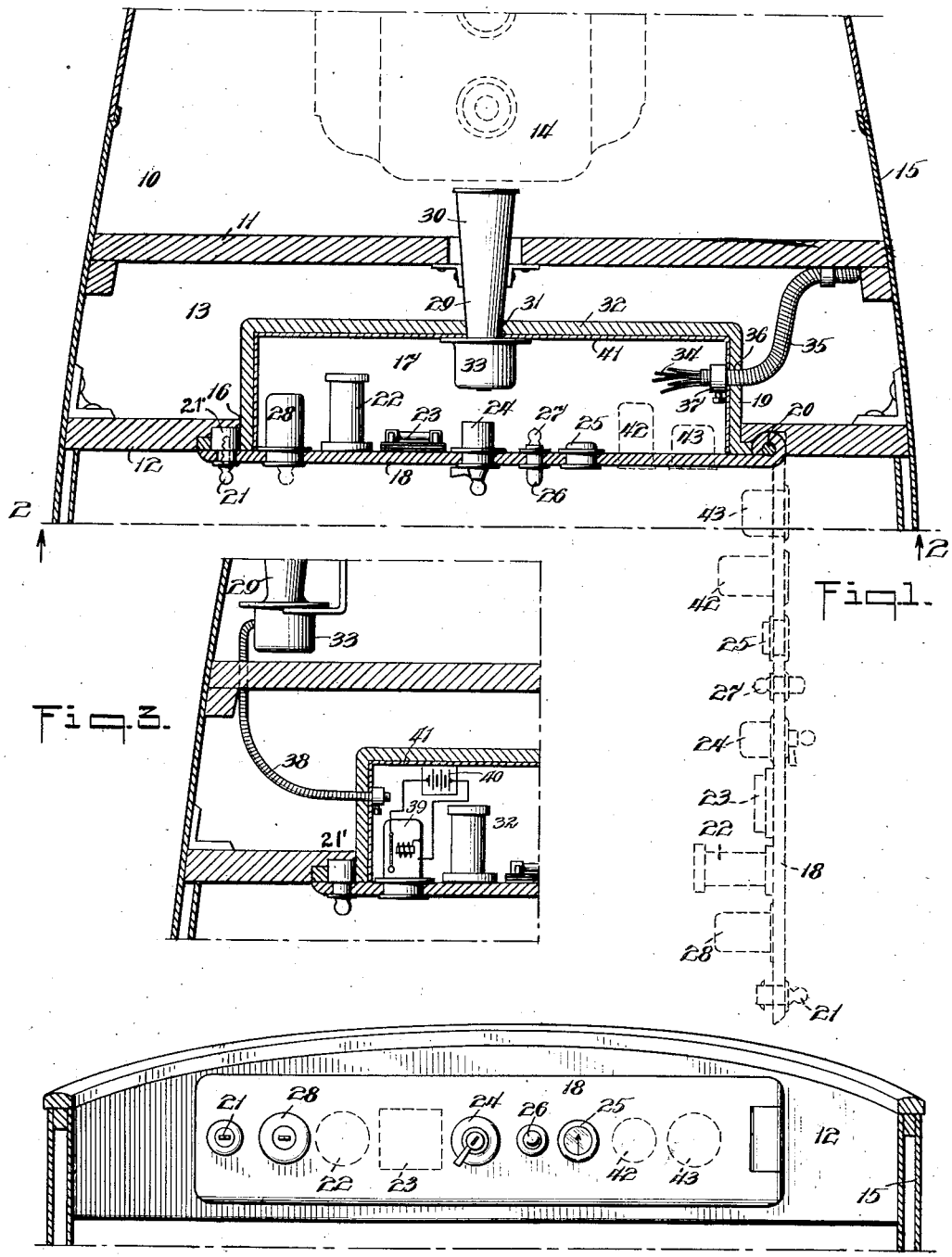
INVENTOR
Howard J. Murray
BY
Warren S. Orton
ATTORNEY

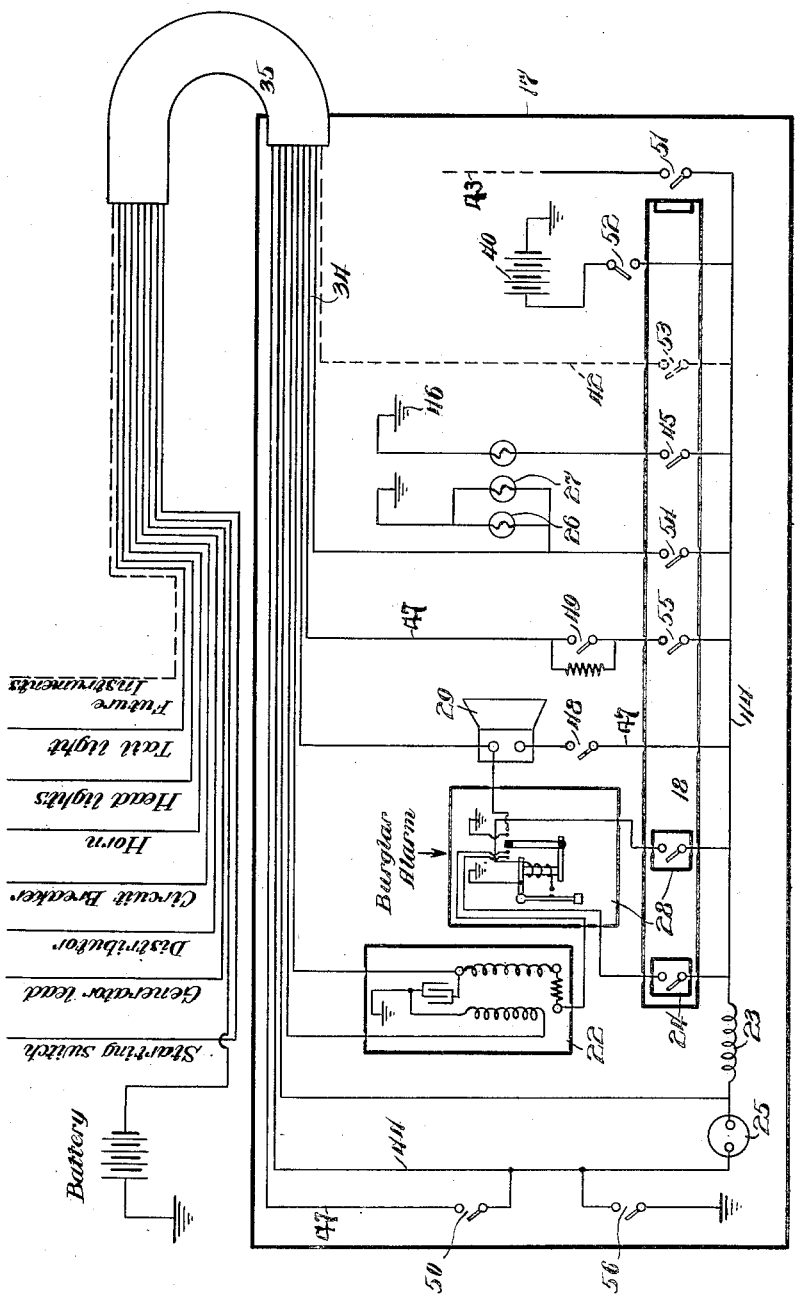

Patented July 22, 1924.

1,502,344

UNITED STATES PATENT OFFICE.

HOWARD J. MURRAY, OF NEW YORK, N. Y.

INSTRUMENT SAFE FOR AUTOMOTIVE VEHICLES.

Application filed January 12, 1921. Serial No. 436,802.

*To all whom it may concern:*

Be it known that I, HOWARD J. MURRAY, a citizen of the United States, and resident of New York city, in the county of Kings and State of New York, have invented certain new and useful Improvements in Instrument Safes for Automotive Vehicles, of which the following is a specification.

The invention relates in general to an improvement in the art of assembling vehicle instruments on an automotive vehicle and specifically relates to an improved form of instrument board or dash-board construction in automotive vehicles which construction will be designated hereinafter as a "safe" for containing the instruments usually found on instrument boards and for containing certain additional instruments collectively identified as "vehicle instruments."

In the following specification the expression "safe" is intended to be of sufficient generic breadth to cover any form of instrument mounting which features constructions designed to defeat unauthorized access to the instruments and specifically the expression is intended to cover any form of burglar proof receptacle which obviously may be constructed either as a separate article of manufacture with approved features to defeat attempts to open the same and provided with means for securely mounting the same in place on the vehicle or, preferably, it may be a built-in or substantial part of the vehicle frame or body, thus featuring additional difficulties in removing the safe as a whole from the vehicle.

The expression "vehicle instrument" is intended to cover any instrument designed for use in connection with automotive vehicles, and which includes induction coils, fuses or relay cut-offs, ignition switches, pilot lights, light switches, electric circuit switches, ammeters, volt meters, inductors, pumps, recording devices, speedometers, odometers, electric batteries, burglar alarms and the like.

In previously known automotive structures it has been usual to mount certain of these vehicle instruments on the dash or instrument board sometimes in a containing casing but in such a way that the instruments can be tampered with, either by inexperienced mechanics in their effort to repair the instruments, or by parties who desire to affect the readings of the instruments, and the previously practiced modes of mounting these instruments have not defeated these attempts, nor in fact, have they prevented the bodily removal of the instruments by unauthorized persons. Usually the removal of a few screws permits the thief to remove an entire instrument from the dash board. By cutting an exposed wire or short circuiting an electric circuit it was possible to put certain of the mechanism controlled by the instruments out of commission.

Accordingly, one of the objects of the invention is to provide a simple form of burglar proof mounting for the instruments on the vehicle which will permit authorized access to the same but which will defeat attempts to render the parts functionally inoperative when tampered with by unauthorized parties.

It is another objectionable feature of present practice in automotive vehicle structures, to dispose the vehicle instruments, sometimes on the instrument board and sometimes in other locations, but in either case the instruments are not readily available for inspection or repair. This not infrequently causes an annoying search for trouble and the repairing of damaged parts under unfavorable conditions, for instance, where the instrument is disposed is a dark and inconvenient position.

Accordingly, the present disclosure features an arrangement in which all the vehicle instruments which can be grouped together are assembled at one place and are arranged in the safe in such a way that the instruments are housed in an out-of-the-way storage space under the cowl or other convenient location, and which instruments can be moved, with the opening of the instrument board, into a lighted position so that they can be readily inspected, or repaired, if necessary.

The present invention constitutes a development in the mounting features of the burglar alarm constituting the subject-matter of my copending applications, Serial No. 352,214, filed January 17, 1920 and Serial No. 436,803 filed January 12, 1921. In these copending applications there is disclosed a signalling device which, when set, will continue to sound an alarm when it is moved. It is proposed in the present disclosure to utilize the usual warning signalling device, such as the automobile horn as the notice impelling element of the burglar alarm disclosed in said preceding applications. As the burglar could put the signalling device out of commission in such an arrangement the present disclosure features the mounting of the entire horn or at least the mechanism containing part of the signalling device within the burglar proof safe herein featured thus to defeat any attempt to prevent the alarm from functioning.

The expression "signalling device" or "notice compelling member" may include a horn, bell, light, or such usual form of burglar indicator, or it may refer to the vehicle engine which, when stalled, will act as an indicator to give notice that something is wrong with the vehicle.

The vehicle instruments are usually mounted to extend into the space under the cowl in advance of the instrument board and in which dust and gas or fumes from the engine are very apt to collect; sometimes resulting in an explosion or fire when the fumes are ignited by sparking of one of the instruments. Aside from this the accumulation of dust is apt to effect delicate electric instruments and the accumulation of moisture and ice impairs the efficiency of such instruments.

Accordingly, another object of the invention is to provide a dust, gas and moisture proof safe for containing the instruments and which, for further precaution may be lined with insulation to reduce fire hazards.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a fragmentary view of the front portion of an automotive vehicle in advance of the operator's seat (not shown) and taken in section on a horizontal plane through the parts which carry the usual instrument board and herein illustrating a preferred embodiment of the invention;

Figure 2 is a transverse sectional view taken on the line 2—2 of Figure 1 showing the front of the safe in elevation and with the door closed; and Figure 3 is a fragmentary detailed view of the left hand portion of the showing in Figure 1, illustrating a modified way of mounting the signalling device.

In the following description and in the claims, parts will be identified by specific names for convenience of expression but they are intended to be as generic in their application to similar parts as the art will permit.

In the drawings, there is shown an automotive vehicle 10, provided with certain structural parts including a forwardly disposed brace 11 and an upstanding dash board 12 providing a storing space 13 therebetween. In advance of the brace 11 there is illustrated in ghost outline in Figure 1, an internal combustion engine 14, positioned between the car sides 15. The dash board 12 is cut away centrally thereof to form an elongated opening 16 in which is positioned a box-like safe 17 constituting an article of manufacture and particularly constituting the subject matter of this disclosure. The safe 17 is entirely opened on its front side to permit ready access to the entire interior, and is closed by means of a door 18 hingedly mounted to a side wall 19 of the safe through the agency of concealed hinges 20. The cover 18 constitutes an instrument board and is preferably designed so as to be mounted flush with the dash board 12. The cover 18 is provided with a lock 21' and is locked in position as shown in full lines in Figure 1 by means of a key 21. The instrument board 18 is provided on its rear or inner side with the instruments which are usually found on automotive structures. In the illustrated showing in Figure 1 there is disclosed an induction coil 22, a fuse or cut-off fuse block 23, an ignition switch 24, and an ammeter 25. The instrument board is provided with certain openings extending therethrough, from one of which projects forwardly a pilot lamp 26.

There is featured in this disclosure the use of an interior electric light 27 which may be lit when the safe is opened to illuminate the instruments carried by the instrument board. There is also shown mounted in one of the openings, a burglar alarm 28 which may be of the type of such instruments disclosed in my above identified application Serial No. 352,214. Certain of these instruments, such as the burglar alarm and the ignition switch are key-controlled from the outside of the safe and it is suggested that the one key 21 may be utilized to control the ignition switch, to set the burglar alarm and to lock the safe.

The instruments are demounted only from the inner side of the instrument board and no more of these instruments are exposed on the outside of the instrument board than is necessary to permit the insertion of the controlling key or to permit the reading of the ammeter and other indicators which are intended to be visible.

There is disclosed an electrically actuated automobile horn 29, which in the disclosure in Figure 1 has its trumpet 30 extending through an opening 31 in the forward wall 32 of the safe and has its mechanism containing casing 33 protected within the outlines of the safe, so that the horn cannot be tampered with from the exterior of the safe. The several conductors 34 which lead to the different instruments within the safe are contained in an armoured cable 35 which has an air tight fit in an opening 36 in the side 19 and is held in position by means of a lock nut 37 engaging the same within the safe.

In those situations where it is intended that the safe be dust, gas and moisture proof it will be understood that the cable, horn, and other contained instruments will constitute a hermetic seal for the several openings into the safe, and thus assist in defeating any tendency of gases or dust to filter into the interior of the safe through these openings.

In those situations where it is possible, as in the showing in Figure 1, to mount the signalling horn within the safe, the burglar alarm 28 may utilize this signalling device as its notice compelling member and in this case there is no necessity for the burglar alarm containing its own notice compelling signalling device as shown in the device illustrated in the above identified application. In some vehicle constructions, however, it is required that the horn or signalling device be advanced forwardly of the vehicle and in spaced relation to the safe which is preferably positioned convenient to the operator. In this case the horn 29 is advanced towards the front of the vehicle and connected to the safe by means of a cable 38 as shown in Figure 3. As the burglar might cut this cable and thus render the horn inoperative it is necessary in this case that the burglar alarm 39 be provided with an independent alarm device in the manner suggested in the above identified pending application.

As the burglar may also attempt to cut the armoured cable 35 and thus cut off the housed instruments from the usual source of electric energy in the vehicle, it is herein suggested that an auxiliary source of electric energy 40 be contained in the safe, electrically connected to supply energy to the alarm device and operatively under the control of the burglar alarm.

The safe has its interior lined with a layer of insulating material 41 which tends to reduce fire hazards and assists in maintaining the safe hermetically closed from external atmosphere.

The instrument board may be constructed to contain other instruments or articles indicated in dotted lines at 42 and 43 which may be of some other form not necessarily electrically actuated such as clock works, license frames, compartments for valuables or tools.

In operation, it will be understood that as many of the vehicle instruments as can be assembled on the instrument board are positioned on the hinged door of the safe and are so arranged that with the door in closed position as shown in full lines in Figure 1 all of the instruments are housed and protected, not only from burglars, inexperienced mechanics and the driver not provided with the key, but also from the effects of dust, gas and moisture. However, the person having the key has ready access for simply by unfastening the lock the board with all of the instruments thereon can be moved into the open position shown in dotted lines in Figure 1, thus providing ready access to all of the instruments. This bodily removal of the instruments can be attained even without disconnecting the conductors 34 for the inner end of these conductors may be flexible and of a length to reach to their respective instruments when the instrument board is in the open position illustrated. Even with the instrument board opened the vehicle can continue to run and any necessary repairs or adjustments can be made without interfering with the travel of the vehicle. The safe can also be utilized to store valuables and it is suggested that the driver's license or other authority be kept in the safe for ready identification.

By means of a device of the class described, the vehicle is rendered substantially burglar proof and at the same time there is no necessity for additional space to be utilized and the instruments usually carried and used in connection with automotive vehicles are kept free from gas, dust, moisture and other foreign matter.

Having thus described my invention, I claim:

1. A safe constituting an article of manufacture provided with means for mounting the same in a vehicle as a fixed part thereof and with a side of the safe exposed, a set of electric control indicating and ignition apparatus for the vehicle, said apparatus being housed within the safe to defeat any attempt to burglarize the same, and certain of said apparatus having parts thereof accessible through the exposed side of the safe thereby to permit an authorized control and to provide for a reading of the indicating apparatus from the exterior of the closed safe.

2. A safe constituting an article of manufacture, and provided with a door, means for locking the door, a key controlled electric instrument secured to the inner side of the door to be housed in said safe when the door is locked and removed from the interior of the safe with the door when the door is opened, said door provided with a key hole for permitting the proper key to be inserted into said instrument from the exterior of the safe, an armoured cable leading from said safe and a conductor in said cable and having a flexible extension in the safe connected electrically to said instrument, thereby to maintain the connection when the door is in an open as well as closed position.

3. A gas-tight safe provided with a plurality of relatively small openings extending through sides of the safe, a cable leading to said safe and acting to close one of the openings, electrically actuated vehicle instruments housed in said safe, closing the other openings and coacting with the cable to make the safe gas-tight, said cable containing conductors leading to the several instruments.

4. A gas-tight safe provided with a plurality of relatively small openings extending through sides of the safe, a cable leading to said safe and acting to close one of the openings, electrically actuated vehicle instruments housed in said safe, closing the other openings and coacting with the cable to make the safe gas-tight, said cable containing conductors leading to the several instruments, a part of the safe constituting a support for certain of said instruments and said support being movable so as to bodily remove the supported instruments from the interior of the safe.

5. A safe adapted to be mounted on a vehicle, constituting a space-enclosing-box provided with a lockable door which when opened permits access to the interior of the safe, a vehicle instrument mounted on the inner side of the door, having its contained mechanism housed within the outlines of the safe and protected thereby from burglarous attempts to affect the same when the door is closed and locked, said door having an opening extending therethrough and said instrument including a part extending through said opening, said extending part having a functional utility in connection with the instrument and provided with means tending to defeat attempts to gain access through the hole to the interior of the safe or to the mechanism in the instrument, said extending part being functionally accessible from the outside of the closed safe.

6. A dust, gas and moisture proof safe provided with a door permitting access to the interior of the safe, said safe lined with an insulating lining and an electrically actuated vehicle instrument housed within and protected by said safe and thus protected both from deleterious gases exterior of the safe and from burglarous attempts to affect the instrument from the exterior of the closed safe and said instrument being functionally accessible from the outside of the closed safe.

7. A safe constituting a burglar resisting box provided with a door permitting access to the interior of the safe, an automobile instrument including a vital part containing mechanism which is desired to be protected and another part which may be exposed without permitting access to said mechanism, said vital part being housed within and protected by the safe from unauthorized tampering with its contained mechanism when the door is closed and said other part extending through one of the walls of the safe and functionally accessible from the exterior of the closed safe.

8. A safe constituting a burglar resisting box, an instrument mounted at the inner side of one wall of the safe, having its contained mechanism housed substantially within the outlines of the safe and protected thereby from burglarous attempts to affect the same, said wall having an opening extending therethrough and said instrument including a part closing said opening, having a functional utility in connection with the instrument and provided with means tending to defeat attempts to gain access through the opening to the interior of the safe or to the mechanism in the instrument, said closing part being functionally accessible from the outside of the safe.

Signed at New York city in the county of New York and State of New York this 5th day of January, A. D. 1921.

HOWARD J. MURRAY